(12) United States Patent
Mascioni et al.

(10) Patent No.: US 8,684,693 B2
(45) Date of Patent: Apr. 1, 2014

(54) DEVICE FOR ADJUSTING THE ANGLE OF ATTACK OF A ROTOR BLADE OF A WIND POWER PLANT

(75) Inventors: Andreas Mascioni, Püttlingen (DE); Jürgen Rinck, Mandelbachtal (DE)

(73) Assignee: Vensys Energy AG, Neunkirchen (DE)

( * ) Notice: Subject to any disclaimer, the term of this patent is extended or adjusted under 35 U.S.C. 154(b) by 662 days.

(21) Appl. No.: 12/922,217

(22) PCT Filed: Mar. 10, 2009

(86) PCT No.: PCT/DE2009/000342
§ 371 (c)(1),
(2), (4) Date: Sep. 13, 2010

(87) PCT Pub. No.: WO2009/112024
PCT Pub. Date: Sep. 17, 2009

(65) Prior Publication Data
US 2011/0014047 A1 Jan. 20, 2011

(30) Foreign Application Priority Data
Mar. 12, 2008 (DE) .......................... 10 2008 013 926

(51) Int. Cl.
*B63H 3/08* (2006.01)
(52) U.S. Cl.
USPC ........................................................ 416/162
(58) Field of Classification Search
USPC .................. 416/159, 160, 162, 246, 147, 155
See application file for complete search history.

(56) References Cited

U.S. PATENT DOCUMENTS

| 5,484,341 A * | 1/1996 | Fujiwara et al. ............... 474/205 |
| 7,354,366 B2 * | 4/2008 | Ballhausen et al. ........... 474/260 |
| 7,507,172 B2 * | 3/2009 | Lehtovaara et al. ........... 474/109 |

FOREIGN PATENT DOCUMENTS

| DE | 3722022 C1 | 9/1988 |
| DE | 4221783 A1 | 1/1994 |
| DE | 4221783 C2 | 6/1994 |
| DE | 19634059 C1 | 10/1997 |
| DE | 19941630 C1 | 3/2001 |
| DE | 102004046260 B4 | 4/2006 |
| DE | 60218737 T2 * | 11/2007 |
| DE | 60218737 T2 | 11/2007 |
| GB | 144038 A * | 6/1920 |
| GB | 144038 A | 6/1920 |
| JP | 2003322218 | 11/2003 |

\* cited by examiner

*Primary Examiner* — Edward Look
*Assistant Examiner* — Christopher J Hargitt
(74) *Attorney, Agent, or Firm* — Lucas & Mercanti, LLP; Klaus P. Stoffel

(57) ABSTRACT

The invention relates to a device for adjusting the angle of attack of a rotor blade of a wind power plant, comprising a flexible clad drive train that can be moved by a driving wheel, wherein the rotor blade can be rotated about the longitudinal axis thereof by said drive train in opposite directions. According to the invention, the clad drive train can be moved only in a single plane perpendicular to the rotational axis of the driving wheel and engages on a pivot bearing ring forming an end piece of the rotor blade, and the driving wheel is connected to a motor/transmission unit, which is mounted on the hub of the rotor blade, for the individual adjustment of the rotor blade.

12 Claims, 2 Drawing Sheets

DEVICE FOR ADJUSTING THE ANGLE OF ATTACK OF A ROTOR BLADE OF A WIND POWER PLANT

This application is a 371 of PCT/DE2009/000342 filed Mar. 10, 2009, which in turn claims the priority of DE 10 2008 013 926.2 filed Mar. 12, 2008, the priority of these applications is hereby claimed and these applications are incorporated by reference herein.

BACKGROUND OF THE INVENTION

The invention relates to an apparatus for adjusting the pitch angle of a rotor blade of a wind energy installation, having a flexible envelope drive train which can be moved by a drive wheel and via which the rotor blade can be rotated in opposite directions about its longitudinal axis.

Wind energy installations are known to be equipped with apparatuses for rotor blade adjustment, in order to match the power of the installations to the wind conditions, in particular to limit their power when the wind is strong. Apparatuses are used both for individual and for joint adjustment of the rotor blades.

DE 42 21 783 C2 discloses an apparatus of the latter type which has the features mentioned initially and in which a closed toothed belt is used as an envelope drive train, which loops around the rotor blade and engages in an external tooth system formed on the rotor blade. The external tooth system is arranged at the side, adjacent to a rotating bearing which connects the rotor blade to the rotor hub. Said toothed belt is rotated through 90° and, furthermore, is deflected through 90° by a roller, such that it engages with a toothed pulley wheel which is seated on a shaft parallel to the rotor rotation axis.

SUMMARY OF THE INVENTION

The invention is based on the object of providing a novel apparatus for rotor blade adjustment of the type mentioned initially, which is of simple design, can be produced with less effort than the known apparatuses of this type, and operates more reliably.

The apparatus which achieves this object according to the invention is characterized in that the envelope drive train can be moved on only a single plane, which is at right angles to the rotation axis of the drive wheel, in that the envelope drive train acts on a rotating bearing ring which forms an end piece of the rotor blade, and in that the drive wheel is connected to a motor/gearbox unit, which is mounted on the hub of the rotor blade, for individual adjustment of the rotor blade.

The movement of the envelope drive train according to the invention solely on only one plane allows a considerably simpler design than the prior art. The outer ring of the rotating bearing, which reinforces the rotor blade at its end facing the rotor hub, directly absorbs the forces which are transmitted through the envelope drive train. There is no need for any special design measures on the rotor blade, directed at the interaction with the envelope drive train. The rotating bearing ring can be designed for its additional function of torque absorption without any reinforcing measures. Because of the capability for individual rotor blade adjustment, the adjustment capability of all the rotor blades cannot fail as a result of faults, nor can this be blocked.

While the envelope drive train could be in the form of a closed ring located around the rotor blade and the drive wheel, it is open in the currently preferred embodiment of the invention, and is connected to the rotating bearing ring at its ends. The looping around the rotating bearing ring is preferably reduced to such an extent that no more than the adjustment of the rotor blade through 90±5°, as required in the normal manner for wind power installations, is possible.

The connection to the rotating bearing ring is expediently in each case made via a solid end piece which, for example, forms a clamping holder for the rest of the envelope drive train. By way of example, the solid end piece can be screwed to the rotating bearing ring in such a way that the connection can easily be released or made again when the envelope drive train is replaced.

The connection of the envelope drive train ends to the rotating bearing ring is preferably provided at circumferential positions, and the drive wheel is arranged close to the circumference of the rotor blade, such that the envelope drive train loops around the rotating bearing ring over a part of its circumference in each rotation position of the rotor blade.

In every case, the positions of the connection between the envelope drive train and the rotating bearing ring, and the length of the open envelope drive train, are chosen so as to achieve a desired rotation angle adjustment range.

The flexible envelope drive train is preferably a belt with a tooth system. The drive wheel also correspondingly has a tooth system.

Alternatively, in one embodiment of the intention, the flexible envelope drive train is formed by a chain, and the drive wheel is a toothed sprocket wheel. A toothed chain, in particular a cradle-type toothed chain, is expediently used.

In the embodiments mentioned with a toothed belt or a chain as the envelope drive train, the rotating bearing ring could expediently be provided with an external tooth system, at least in the looping-around area or in a part of the looping-around area.

The flexible envelope drive train can be stressed by moving the connecting position of one or both clamping holders in the circumferential direction on the rotating bearing ring.

Alternatively or additionally, the envelope drive train could be stressed by the drive wheel which, for this purpose, is arranged at a suitable radial distance from the rotating bearing ring.

Furthermore, at least one tensioning roller could be provided in order to stress the envelope drive train. This is preferably a single tensioning roller which, in particular, rests against the envelope drive train on that side of the flexible envelope drive train which is remote from the drive wheel. The arrangement between the drive wheel and the rotating bearing ring also makes it possible to use the tensioning roller to increase the looping-around angle of the drive train.

The position of the drive wheel and/or the position of the tensioning roller can be adjustable.

While it would be possible to individually successively adjust all the rotor blades of a rotor by means of a single motor/gearbox unit, in the preferred embodiment of the invention, each rotor blade of the wind energy installation has an associated motor/gearbox unit.

In one embodiment of the invention, the toothed belt has a carbon material, in which case, in particular, a tension member which reinforces the toothed belt is produced from a material such as this.

Polyurethane is expediently used as the basic material for the toothed belt.

It is self-evident that the envelope drive train is formed from a plurality of parts and, for example, may consist of a plurality of toothed belts in parallel with one another.

The invention will be explained in more detail in the following text with reference to exemplary embodiments and to the attached drawings, which relate to these exemplary embodiments and in which:

DETAILED DESCRIPTION OF THE INVENTION

Figure 1:
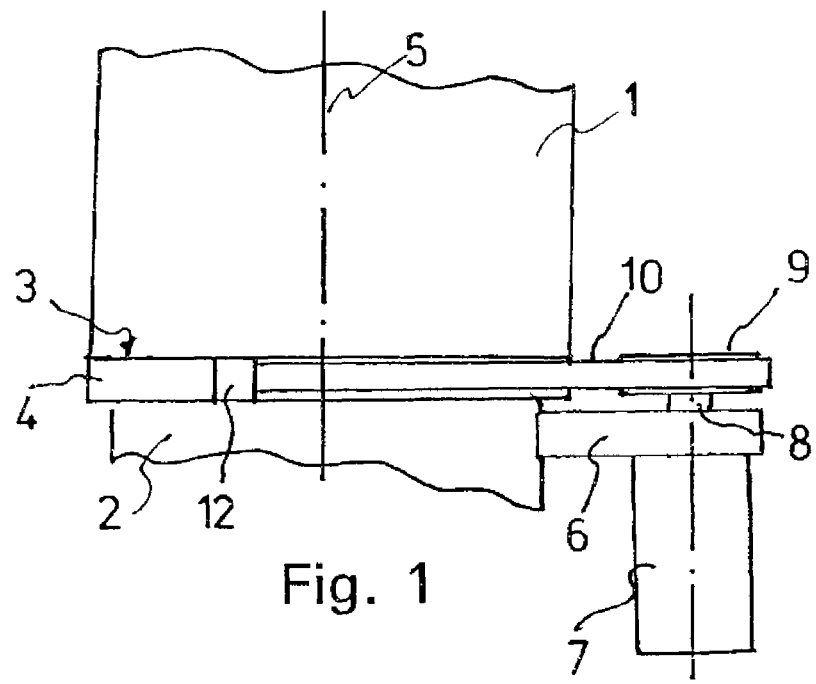
FIG. 1 shows a schematic illustration, in the form of a side view, of an apparatus according to the invention.

An end section of a rotor blade 1 of a wind energy installation, as illustrated in FIG. 1, is connected to a rotor hub 2, which is shown partially in FIG. 1. Two further such rotor blades (not shown) are seated on the rotor hub 2, with an angular interval of 120° between the three rotor blades.

Figure 3:
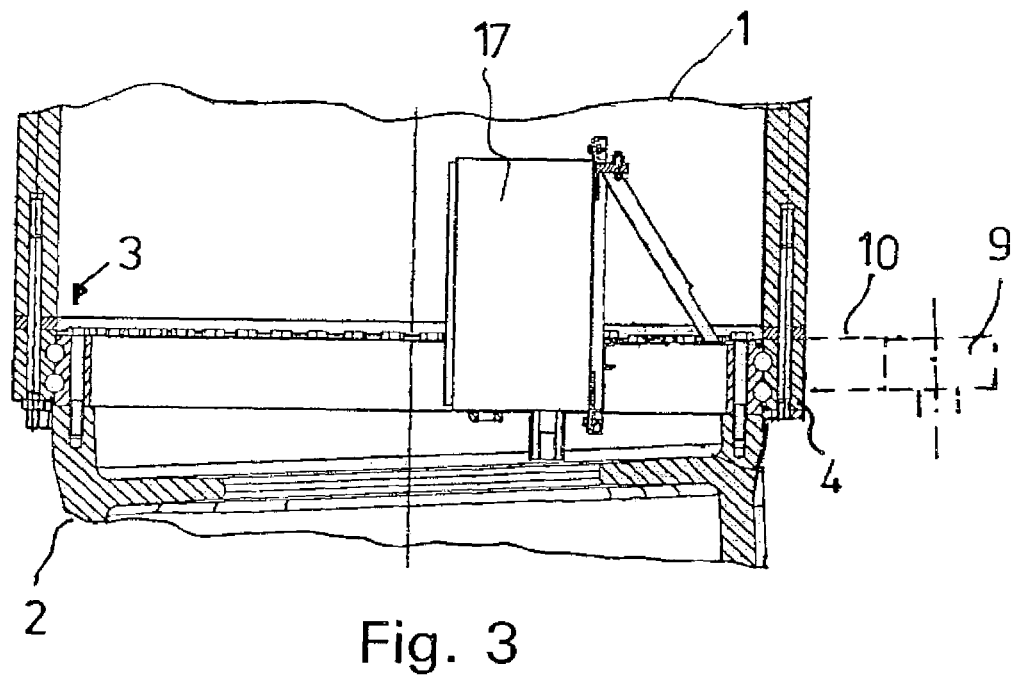
FIG. 3 shows a partial illustration, in the form of a sectioned side view, of the apparatus shown in FIG. 1.

The connection between the rotor blade 1 and the rotor hub 2 is made via a rotating bearing 3, which can be seen in particular in FIG. 3. The rotating bearing 3 has an external rotating bearing ring 4, which forms an end piece of the rotor blade 1.

The rotating bearing 3 allows the rotor blade to rotate about its longitudinal axis 5, and therefore makes it possible to vary the pitch angle of the rotor blade with respect to the wind direction.

A motor/gearbox unit 7 is fitted to the rotor hub via a support block 6 on the side of the rotor hub 2 facing the incident wind.

A pulley wheel 9 can be rotated by the motor/gearbox unit 7 via a shaft 8.

A flexible envelope drive train 10, which is formed by a preferably toothed belt, is placed around the pulley wheel 9. End pieces 11 and 12 which clamp in the belt end are provided at both ends of the open envelope drive train, by means of each of which a connection, for example a screw connection, is made between the envelope drive train 10 and the rotating bearing ring 4. In the areas 13 and 14, the envelope drive train 10 loops around the rotating bearing ring 4 over a part of its circumference.

In order to adjust the pitch angle of the rotor blade 1, the motor/gearbox unit 7 is operated after unlocking a locking device 17 which holds the rotor blade in a specific rotation position. The pulley wheel 9 moves the envelope drive train 10 as indicated by the double-headed arrow 15, depending on the rotation direction of the shaft 8, with the envelope drive train 10 converting this movement to a corresponding rotation of the rotor blade 1 about the axis 5.

During the adjustment of the rotor blade, one of the two ends of the envelope drive train 10 in each case exerts a tensile force, while the respective other end is pulled by the rotated rotor blade. The roller 9 furthermore ensures that the envelope drive train 10 is adequately stressed. The length of the envelope drive train is designed so as to provide a desired rotation angle range.

Figure 2:
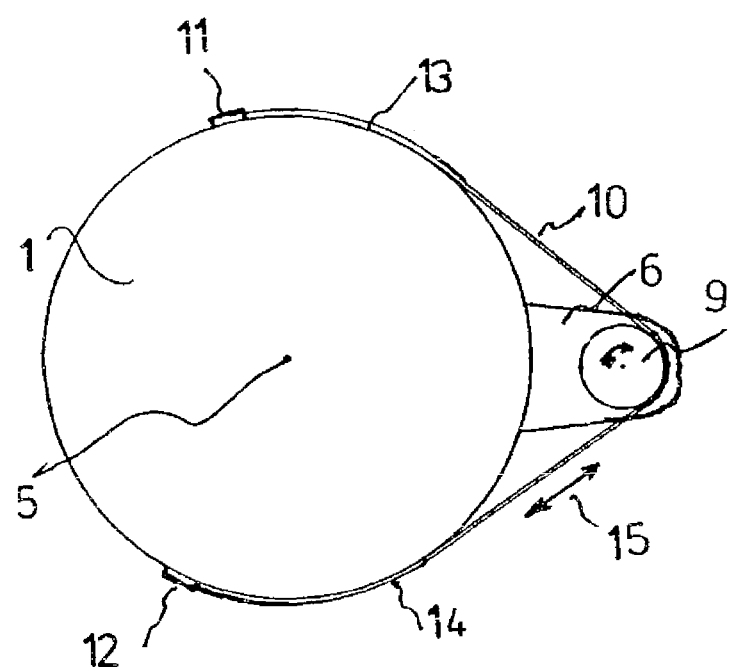
FIG. 2 shows a plan view of the apparatus shown in FIG. 1.
Figure 4:
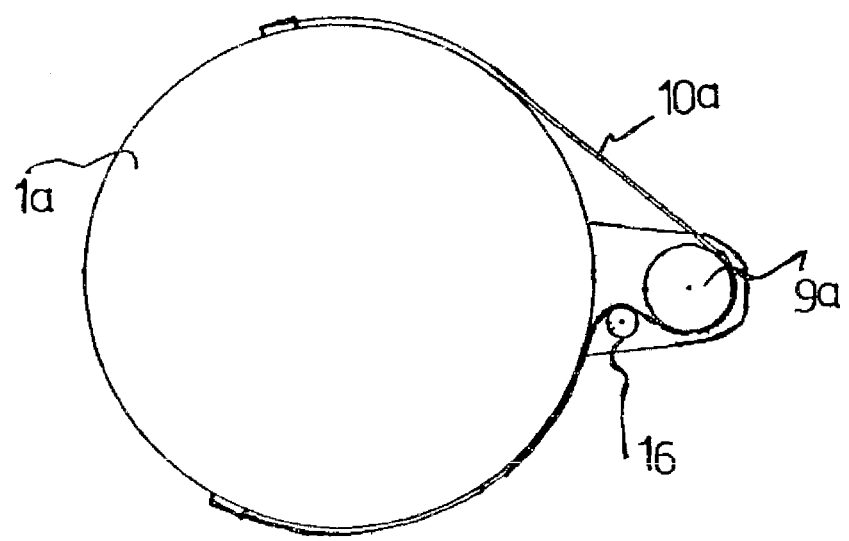
FIG. 4 shows a plan view of a second exemplary embodiment of an apparatus according to the invention.

While, in the case of the exemplary embodiment shown in FIGS. 1 to 3, the pulley wheel 9 on its own ensures that the envelope drive train 10 is stressed, a tension roller 16 is provided in the exemplary embodiment shown in FIG. 4, which tensioning roller 16 acts on the envelope drive train 10*a* on the side of the envelope drive train opposite a pulley wheel 1*a*, and keeps it stressed.

Particularly in the case of the exemplary embodiment shown in FIGS. 1 to 3, the envelope drive train 10 can be formed by a chain, with the pulley wheel being replaced by a sprocket wheel.

The invention claimed is:

1. An apparatus for adjusting the pitch angle of a rotor blade (1) of a wind energy installation, having a flexible envelope drive train (10) which can be moved and stressed by a drive wheel (9) and via which the rotor blade (1) can be rotated in opposite directions about its longitudinal axis and having a tensioning roller for increasing a looping-around angle of the drive train which stresses the flexible envelope drive train, wherein the envelope drive train (10) can be moved on only a single plane, which is at right angles to the rotation axis of the drive wheel (9), and acts on a rotating bearing ring which forms an end piece of the rotor blade (1), and in that the drive wheel (9) is connected to a motor/gearbox unit (7), which is mounted on the hub (2) of the rotor blade (1), for individual adjustment of the rotor blade, wherein the envelope drive train is open and is connected at its ends to the rotating bearing ring so that the envelope drive train (10) loops around the rotating bearing ring (4) over a part (13, 14) of its circumference in each rotation position of the rotor blade (1).

2. The apparatus as claimed in claim 1, wherein the flexible envelope drive train (10) is connected at each of the ends via a solid end piece (11, 12) to the rotating bearing ring (4).

3. The apparatus as claimed in claim 1, wherein the flexible envelope drive train (10) comprises a toothed belt and/or a chain.

4. The apparatus as claimed in claim 3, wherein the toothed belt has a carbon material.

5. The apparatus as claimed in claim 4, wherein the toothed belt comprises a tension member composed of carbon material.

6. The apparatus as claimed in claim 3, wherein the toothed belt has polyurethane as the basic material.

7. The apparatus as claimed in claim 3, wherein the chain comprises a toothed chain.

8. The apparatus as claimed in claim 7, wherein the chain comprises a cradle-type toothed chain.

9. The apparatus as claimed in claim 1, wherein the tensioning roller is a single tensioning roller (16).

10. The apparatus as claimed in claim 1, wherein the tensioning roller (16) rests against the envelope drive train (10*a*) on that side of the flexible envelope drive train (10*a*) which is remote from the drive wheel (9*a*).

11. The apparatus as claimed in claim 1, wherein the position of the drive wheel (9, 9*a*) and/or the position of the tensioning roller (16) are/is adjustable.

12. The apparatus as claimed in claim 1, wherein the rotating bearing ring is at least partially toothed, at least in the looping-around area, on its side facing the envelope drive train (10).

* * * * *

UNITED STATES PATENT AND TRADEMARK OFFICE
CERTIFICATE OF CORRECTION

PATENT NO.        : 8,684,693 B2
APPLICATION NO.   : 12/922217
DATED             : April 1, 2014
INVENTOR(S)       : Mascioni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Twenty-ninth Day of September, 2015

Michelle K. Lee
*Director of the United States Patent and Trademark Office*